United States Patent [19]
Lerner

[11] 3,941,148
[45] Mar. 2, 1976

[54] CONTROL VALVE DRIVE
[75] Inventor: Julius Lerner, Broomall, Pa.
[73] Assignee: Sun Oil Company of Pennsylvania, Philadelphia, Pa.
[22] Filed: Apr. 17, 1975
[21] Appl. No.: 568,966

[52] U.S. Cl. ............................................... 137/486
[51] Int. Cl.² ......................................... F16K 17/20
[58] Field of Search ...................................... 137/486

[56] References Cited
UNITED STATES PATENTS
3,794,069  2/1974  Gulick ................................. 137/486

*Primary Examiner*—Henry T. Klinksiek
*Attorney, Agent, or Firm*—J. Edward Hess; Donald R. Johnson; William C. Roch

[57] ABSTRACT

A system for controlling a pneumatic rising stem valve by a stepping motor is disclosed. A pressure regulator is connected to the stepping motor so that the air pressure applied to the valve can be varied according to the signals applied to the stepping motor.

3 Claims, 1 Drawing Figure

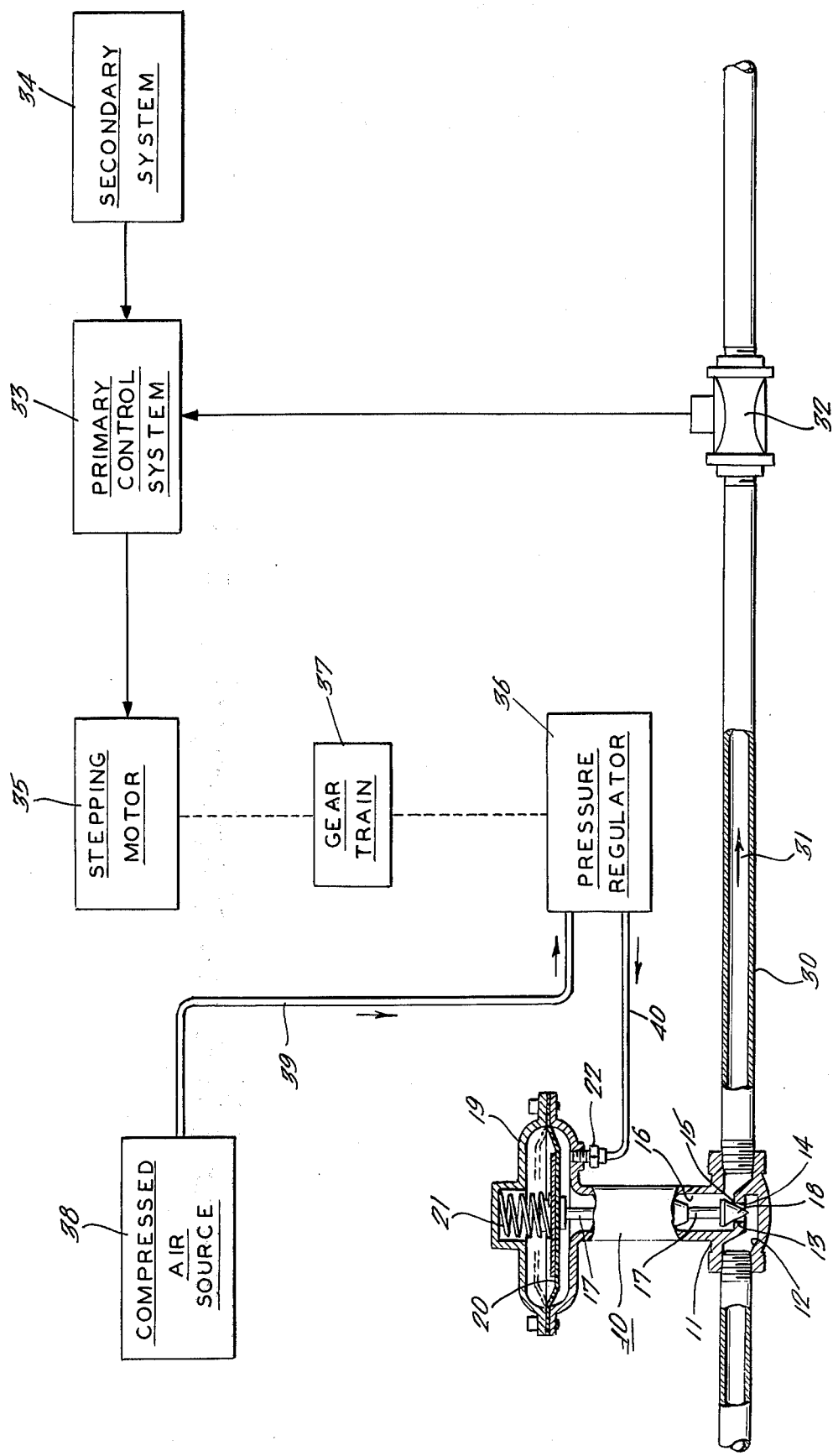

CONTROL VALVE DRIVE

FIELD OF INVENTION

This invention relates to the control of valves by motors and, more specifically, to the control of pneumatic rising stem valves by stepping motors.

PRIOR ART

Stepping motors are commonly used to control the valve position on many kinds of valves and are particularly adaptable to the digital control systems which are frequently used to control fluid flow process. However, these systems are primarily limited to using those kinds of valves which can be connected directly to the stepping motor, for example, butterfly, plug, or Camflex valves.

Rising stem valves are often used, especially on systems with low flow rates. It is also desirable to control these valves pneumatically when working with low flow rates, because of the ability to control the flow rate more precisely. Therefore, for optimum performance, a rising stem valve which is pneumatically controlled is often desired. Controlling the pneumatic operation by a step motor increases the versatility of the valve system by allowing easy connection to conventional digital control systems. However, no such valve control system is currently available.

SUMMARY OF INVENTION

In accordance with a preferred embodiment a valve control system for conventional rising stem valves is provided. The valve control system disclosed herein controls a pneumatic rising stem valve by using a pressure regulator which controls the amount of pressure applied to the valve. A stepping motor, actuated by a fluid flow control system is mechanically connected to the pressure regulator, whereby the valve position is controlled by signals from the control system sent to the stepping motor.

This system permits the conversion of conventional pneumatic valve systems to one having digital control capabilities, using commercially available components. An additional advantage is that rising stem valves can not be used where heretofore other kinds of valves had to be used because of the inability to automatically control the pneumatic actuation.

A better understanding of the invention and its advantages can be obtained by reference to the following description of the FIGURE and preferred embodiment.

DESCRIPTION OF THE FIGURE AND PREFERRED EMBODIMENT

In the FIGURE, a schematic diagram of a valve position system for a pneumatic rising stem valve according to this invention is shown.

A typical pneumatic rising stem valve assembly 10 is illustrated in the FIGURE. Valve assembly 10 can have either an air bellows or an air diaphram actuation system. However, an air diaphram valve is illustrated in the FIGURE as an example only. Valve assembly 10 has a valve housing 11 with a channel 12 through which fluid flows. A partition 13 with an opening 14 forms a valve seat 15. An elongated passage 16 extending transversely from channel 12 houses a valve stem 17, which is sealed within said passage (by means not shown), and a valve head 18. Diaphram housing 19 contains a diaphram 20 which is connected to valve stem 17 on the bottom side and biasing spring 21 on the top side. Biasing spring 21 provides sufficient force to keep valve head 18 against valve seat 15 in the closed position. Actuation of the valve is accomplished by applying increased air pressure to the lower section of diaphram chamber 19 through connection 22, thereby forcing diaphram 20 upwards and pulling valve stem 17 upwards.

Valve assembly 10 is typically connected to a conduit 30 with fluid flowing in the direction of arrow 31. A flow meter 32 is installed either upstream or downstream from valve assembly 10. A primary control system 33 receives feedback signals from meter 32, indicating the actual flow rate in conduit 30. Control system 33 also receives a command signal indicating the flow rate desired. This signal may come from secondary system 34 indicating the desired flow rate of the fluid in conduit 30 so that the proper amount of this fluid is combined with the fluid in the second system. Also, a manual command signal can be set in primary control system 33 so that the flow rate in conduit 30 remains constant.

Stepping motor 35 is preferably of the type which rotates a given increment in a given direction upon receipt of a specific number and polarity of pulses from primary control system 33. This motion is transmitted to a pressure regulator 36 through a gear train 37.

Pressure regulator 36 is connected to a compressed air supply 38 through line 39 and to connection 22 on valve assembly 10 through line 40. When the pressure regulator drive shaft (not shown), connected to gear train 37, is rotated, the pressure applied to the lower diaphram chamber through line 40 is varied accordingly.

When in operation, an appropriate signal is sent to primary control system 33, indicating the flow rate desired in conduit 30. As indicated above, this command signal may come from another system which requires a given amount of fluid from conduit 30, for example, secondary system 34. Alternatively, primary control system 33 can be preset for a given constant flow rate which must be obtained.

When primary control system 33 receives this command signal, it is compared to the feedback signal from flowmeter 32, which indicates the existing flow rate in conduit 30. The difference between the command and feedback signals is transformed into a digital control signal which flows to stepping motor 35. Digital control systems with this capability are commonly known to those skilled in the art and constitute no part of this invention.

Stepping motor 35 then rotates a given amount and direction for the digital signal received. This motion is transmitted through gear train 37 to pressure regulator 36. The air pressure being supplied to valve assembly 10 is then altered according to the distance and direction the pressure regulator drive shaft (not shown) is rotated, whereby valve head 18 is moved away from or closer to valve seat 15 to alter the flow rate accordingly. Once the flow rate reaches the value indicated by the command signal, the feedback signal from flowmeter 32 will have an equivalent value and no signal will be sent to stepping motor 35.

While the description above has used a rising stem valve, it is understood that the same system could be employed with many kinds of pneumatic valves, thereby affording them the same advantages.

While a particular embodiment of this invention has been shown and described, it is obvious that changes and modifications can be made without departing from the true spirit and scope of the invention. It is the intention in the appended claims to cover all such changes and modifications.

The invention claimed is:

1. An apparatus for automatically controlling a pneumatic valve located in a conduit having fluid flowing inside, and comprising:
   a. pneumatic valving means connected to the conduit;
   b. a source of compressed air for actuating the pneumatic valving means;
   c. means for measuring the flow rate of fluid in the conduit and for producing a feedback signal indicating the flow rate;
   d. means for producing a command signal indicating the flow rate desired in the conduit;
   e. means for receiving the command and feedback signals and for producing a control signal to control the valving means; and
   f. means, in communication with the source of compressed air and the valving means, for varying the air pressure supplied to the valving means in response to the control signal produced by the control system.

2. Apparatus recited in claim 1 wherein the air pressure varying means comprises:
   a. a stepping motor to receive the control signal; and
   b. a pressure regulator connected between the compressed air source and the valving means, said regulator being in communication with the stepping motor whereby the air pressure from the air pressure source to the valving means is varied by the rotation of the stepping motor.

3. Apparatus recited in claim 1 wherein the pneumatic valving means is a rising stem valve.

* * * * *